Dec. 31, 1968  S. T. MARTIN  3,418,940
FLUID MATERIAL TRANSFER APPARATUS
Filed Nov. 18, 1966
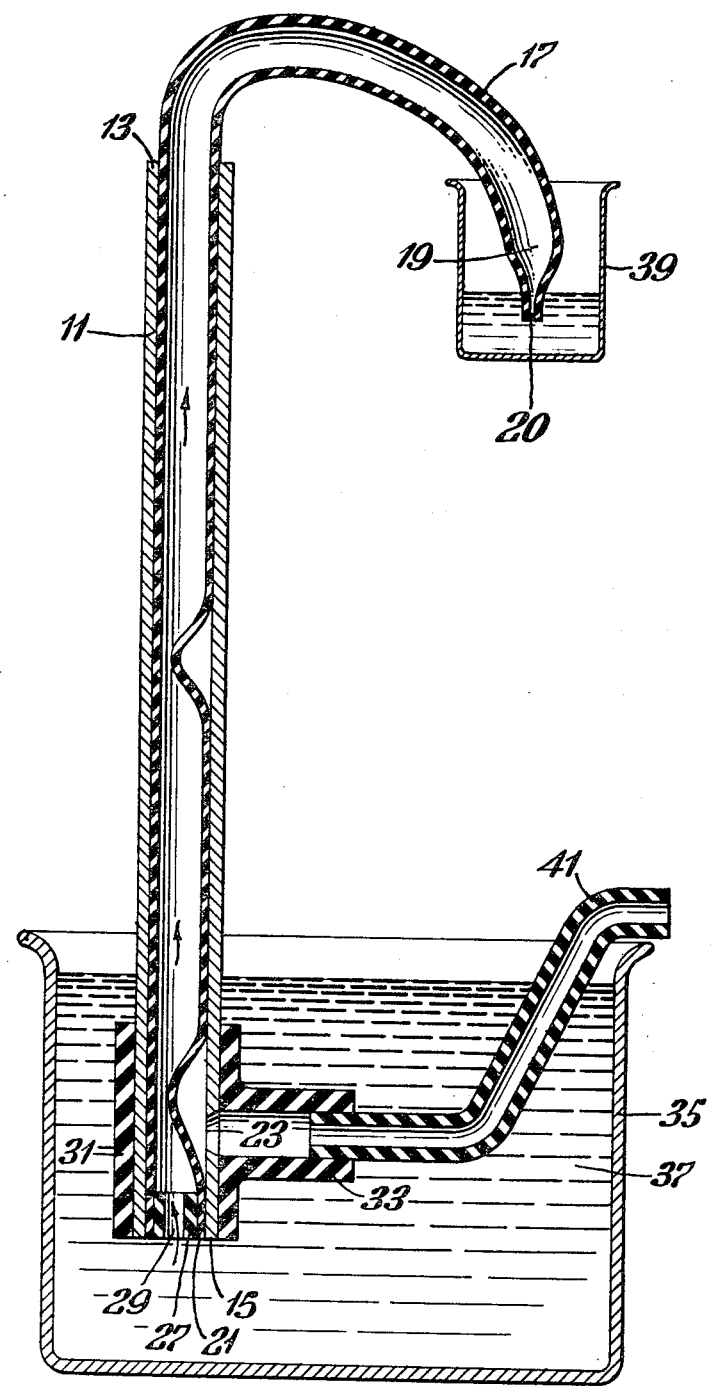
INVENTOR
STERLING T. MARTIN
BY Maurice W. Ryan
ATTORNEY United States Patent Office 3,418,940
Patented Dec. 31, 1968

3,418,940
FLUID MATERIAL TRANSFER APPARATUS
Sterling T. Martin, Charleston, W. Va., assignor to Union Carbide Corporation, a corporation of New York
Filed Nov. 18, 1966, Ser. No. 595,444
2 Claims. (Cl. 103—152)

ABSTRACT OF THE DISCLOSURE

Apparatus capable of operating as a valveless pump for transferring a sample of fluid from one source to another comprising an inner conduit concentrically enclosed within an outer conduit, the interface between the conduits being sealed at one end by plug means which simultaneously operates as a one-way valve. A pulsating fluid medium is introduced into the annular space between the conduits which by peristaltic motion forces fluid up through the inner conduit.

---

This invention relates to a fluid material transfer apparatus and more particularly to a fluid material transfer apparatus capable of operating as a valveless pump for the transfer or lifting of fluids, particularly liquids, from relatively inaccessible zones to collection points in relatively accessible zones.

Conventionally available pumping equipment customarily used for the transfer of relatively clean or pure liquids and other fluids has been found essentially inapplicable to pumping duties involved in the transference of fluids encountered in certain operations of the chemical process industry, particularly in the handling of waste fluids. Industrial wastes frequently contain impurities in the nature of solids, semi-liquids or plastic materials which clog the relatively delicate valving mechanisms in conventional pumping equipment. In the sampling of waste materials for purposes of pollution control and the like, it is imperative that the sampling equipment operate reliably, continually and be capable of extracting truly representative samples containing all of the components contained in the sampled stream. With known equipment, the valves, as noted above, not only tend to clog because of the nature of waste streams but such equipment also produces what amounts to a filtered, stripped or deprived sample thus bringing about inaccurate analytical results.

Towards the solution of these problems which are well known to persons familiar with pollution control work, the present invention has been developed with the principal object of providing a structurally simple, operationally reliable fluid transference apparatus which can be immersed in an industrial waste stream, a sewer, or any other stream or body of fluid which is to be sampled.

It is a further object of this invention to provide a fluid transference apparatus which can operate unattended and with a minimum of maintenance over protracted periods of time.

It is a still further object of the present invention to provide a fluid transfer apparatus requiring only a pulsating pneumatic or other pressurized pulsating fluid driving or actuating source.

In general and in accordance with the objects of this invention, the apparatus of the invention comprehends a first elongate tube or conduit means having an inlet end and an outlet end. Adjacent the inlet end of said conduit means there is provided a lateral port or opening through the wall thereof. A second conduit means or liner is disposed concentrically within said first conduit means with the outer surface of said liner in substantially continuous contact with the interior surface of the first conduit means. The liner must have a higher degree of elasticity and flexibility than the first or outer conduit means so that in operation, the contacting surfaces of the two conduits may be urged apart by an actuating fluid whilst permitting the resumption of this contact after the passage of said actuating fluid. At the inlet end of the first conduit means there is provided means to effect fluid-tight sealing between the inner surface of the first conduit means and the outer surface of the second conduit means at a location between the lateral port and the respective inlet ends of said first and second conduit means. Connection means are provided communicating with said lateral port in the first conduit means whereby a pulsating pressurized fluid actuating medium may be continually introduced between the interior surface of the first conduit means and the exterior surface of the second conduit means so as to depress or constrict the relatively more flexible second conduit means or liner and urge whatever material may be therein contained through said liner. The actuating fluid medium ultimately immerges through an annular space formed between the outlet end of the first conduit means and the outer surface of the second conduit means or liner.

The invention will now be defined in particular detail and with reference to the single drawing figure which is a cross-sectional view, partly schematic, of apparatus according to the present invention.

With reference to the drawing there is shown as a first or outer conduit a tubing 11 which is open at both the upper end 13 and the lower end 15. A second or liner conduit 17 is shown disposed concentrically within tubing 11. Tubing 17 is of a material relatively more flexible and more elastic than the material of tubing 11. The liner 17 has an upper end 19 and a lower end 21. Lower end 21 of liner 17 is open and in communication with the fluid to be pumped. Upper end 19 of liner 17 is provided with a constricted or flattened end portion 20 which serves as a check valve in operation to prevent reverse flow siphoning. Tubing 11 is provided with an opening or port 23 in the wall thereof adjacent the lower end 15. The liner 17 and the tubing 11 are so sized respectively that the outer surface of the tubnig 17 is in substantially continuous contact with the inner surface of tubing 11. Since liner 17 is flexible howeber the contacting surfaces may be urged apart but the elasticity of liner 17 will tend to return it to its original position contacting tubing 11's interior surface. At the lower ends 15 and 21 of the tubing 11 and liner 17 there is provided a sealing plug 27 having an opening 29. Plug 27 is inserted into the end 21 of liner 17 to effect fluid-tight sealing between the outer surface of liner 17 and the inner surface of tubing 11 at this lower end point. A T fitting 31 is fitted over the lower end of tubing 11 with the leg 33 of the T arranged in registering relationship with the port 23.

In operation the apparatus is arranged with its lower or inlet end, that is to say the end with the T, immersed in a body of fluid which is to be transferred or lifted. In the drawing there is shown a container 35 containing liquid 37 which is to be lifted to a receiver 39 at some elevation higher than the elevation of the body of liquid 37. The leg 33 of T 31 is fitted with an actuating fluid delivery conduit 41 which connects to a pressurized pulsating actuating fluid source not shown. The actuating fluid may be air or a liquid or any fluid which can be delivered in pulses at a preselected frequency.

Liquid 37 finds an initial level inside liner 17, flowing therein through the opening 29 in plug 27. As a pulse of pressurized actuating fluid is delivered through conduit 41, leg 33 of the T 31 and lateral port 23, the liner 17 is compressed away from the inner surface of tubing 11. The actuating medium pulse can travel only in one direction, upward, since the lower ends of the liner and the outer tubing are sealed by the plug 27. As the pulse of actuating medium travels upward, compressing the liner 17 as it progresses, the fluid 37 contained in liner 17 rises and is eventually carried out through the upper end 19 and the constricted or flattened end portion 20 of the liner into receiver 39. The actuating medium pulse is vented to the atmosphere as liner 17 is compressed away from the upper or outlet end 13 of tubing 11.

The frequency of the actuating fluid pulses will determine the flow quantity lifted for any particular design of transference apparatus.

Alternative constructions are also possible. For example, the lower end 21 of the second conduit or liner 17 need not register with the lower end 15 of the first conduit 11 but may extend beyond conduit 11 in order to facilitate intake of fluid from any desired location such as for example a sewer invert. Instead of a plug 27 to effect the fluid-tight sealing at the lower end of conduit 11, the sealing may be equally well effected by an enlarged diameter portion of liner 17. In further alternative embodiments, the constricted or flattened end portion 20 of liner 17 may be replaced by any suitable one-way check valve construction.

A transference apparatus according to the present invention was fabricated as follows: a 6 foot long ½ inch outside diameter polyethylene tubing was selected for the outer conduit and notched at one end to form a lateral port through its wall. For a liner, a 6½ foot long ⅜ inch outside diameter gum rubber tubing was pulled into the polyethylene tubing with the excess ½ foot of gum rubber tubing extending from the end of the polyethylene tubing opposite the notched end. The gum rubber tubing liner was provided with a flexible "duck bill" type valve to furnish a constricted or flattened end 20 at the upper end 19 of the liner. A ½ inch x ½ inch x ⅜ inch tubing T was assembled over the registering ends of the tubings with the ⅜ inch leg of the T aligned with the notch or lateral port in the polyethylene tube. No tube compression nuts on the ½ inch legs of the T were tightened to effect close sealing of the T to the polyethylene tube. A ¼ inch outside diameter x 1½ inch long piece of copper tubing was inserted into the gum rubber tubing at the T end to effect sealing of the gum rubber tubing against the inner wall of the polyethylene tube. A ¼ inch outside diameter tube was assembled to the ⅜ inch leg of the tube to serve as a connection to a pulsating air source adjusted to deliver an actuating air pulse of about 1 second duration at a pressure of 12 to 15 pounds per square inch gauge on a 4-second cycle. The apparatus was installed with the T end immersed in a flowing stream of waste material and delivered 100 to 110 cubic centimeters of waste fluid to a 30-gallon collecting drum which became filled about every 24 hours and was then analyzed for pollution content. It has proven consistently reliable and fault free in protracted duty in several stream pollution control installations in chemical process industry plants.

From the foregoing description persons familiar with the art will appreciate that this invention constitutes a significant advance in fluid transference apparatus by providing a device which can be assembled from easily available components and used in most existing sampling tubes or manholes, it being necessary only to have sufficient passage room to position the assembled tubes between the fluid source to be pumped and the collector receptacle. The apparatus has the further advantage of containing only one operating part, the liner tube which is alternately squeezed and relaxed by the actuating fluid pulses thus minimizing mechanical wear and maintenance. The sampled fluid is not changed, altered, filtered or diluted since the actuating fluid is isolated from contact with the sampled fluid. No priming is required to start the device operating and the absence of valves and relatively small orifices and passages permits pumping whatever particalized solids may occur in the fluid being transferred. Since the operation is solely through the use of an actuating fluid the units can be used in hazardous areas. In addition the invention has the commercially attractive feature of being low in cost.

This description has been set forth as illustrative only and it is intended to limit the scope of the invention only by the appended claims.

What is claimed is:

1. Apparatus for conveying fluid material comprising in combination first conduit means having an inlet end and an outlet end; second conduit means having an inlet end and an outlet end, said second conduit means being arranged at least partially interior of said first conduit means with that portion of the outer surface of said second conduit means which is interior of said first conduit means being in substantially continuous contact with the interior surface of said first conduit means, the relative elasticity resiliency and flexibility of said second conduit means being greater than that of said first conduit means; means for effecting a fluid-tight seal between the inner surface of the first conduit means and the outer surface of the second conduit means at the inlet end of said first conduit means and for simultaneously restricting fluid flow in one direction within said second conduit means; said sealing and restricting means comprising a hollow plug having an outside diameter smaller than the inside diameter of the first conduit means and larger than the inside diameter of the second conduit means and an inside diameter of predetermined size such that the inlet opening is sufficiently constricted to substantially restrict fluid flow in the direction opposite the fluid discharge direction, said hollow plug being the sole inlet valving means; and passage means for the introduction of a pressurized fluid medium between the inner surface of the first conduit means and the outer surface of the second conduit means at a location adjacent the means to effect fluid-tight sealing.

2. Apparatus according to claim 1 wherein said hollow plug is cylindrical.

References Cited

UNITED STATES PATENTS

| 2,812,716 | 11/1957 | Gray | 103—44 |
| 3,007,416 | 11/1961 | Childs | 103—44 |
| 3,039,309 | 6/1962 | Vesper et al. | 73—421 |
| 3,045,601 | 7/1962 | Rippingville | 103—44 |
| 3,062,153 | 11/1962 | Losey | 103—152 |
| 3,148,624 | 9/1964 | Baldwin | 103—44 |
| 3,208,448 | 9/1965 | Woodward | 103—44 |

FRED C. MATTERN, Jr., *Primary Examiner.*

W. J. KRAUSS, *Assistant Examiner.*

U.S. Cl. X.R.

103—44; 73—421